Figure 1:
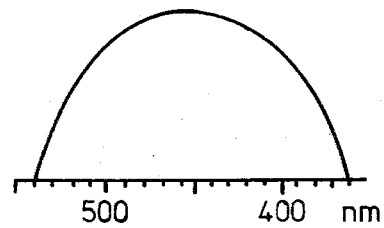

United States Patent [19]

Öhlschläger

[11] 4,229,526
[45] Oct. 21, 1980

[54] LIGHT-SENSITIVE PHOTOGRAPHIC RECORDING MATERIAL

[75] Inventor: Hans Öhlschläger, Bergisch-Gladbach, Fed. Rep. of Germany

[73] Assignee: AGFA-Gevaert, A.G., Fed. Rep. of Germany

[21] Appl. No.: 60,737

[22] Filed: Jul. 25, 1979

[30] Foreign Application Priority Data

Jul. 28, 1978 [DE] Fed. Rep. of Germany ....... 2833137

[51] Int. Cl.$^2$ ................................................ G03C 1/16
[52] U.S. Cl. ................................................... 430/583
[58] Field of Search ............... 430/583, 582, 595, 589, 430/597

[56] References Cited

U.S. PATENT DOCUMENTS

| | | | |
|---|---|---|---|
| 2,464,780 | 3/1949 | Anish | 430/583 |
| 3,576,640 | 4/1971 | Van Lare et al. | 430/583 |
| 4,102,688 | 7/1978 | Sugiyama et al. | 430/583 |

FOREIGN PATENT DOCUMENTS 2057617  6/1971  Fed. Rep. of Germany ........... 430/583

*Primary Examiner*—J. Travis Brown
*Attorney, Agent, or Firm*—Connolly & Hutz

[57] ABSTRACT

Pyrimidone or thiopyrimidone benzothiazole monomethine cyanines are valuable spectral sensitizers for sensitizing negative silver halide emulsions in the blue region of the spectrum. In contrast to other known monomethine cyanines they have little or no desensitizing effect in the range of inherent sensitivity.

2 Claims, 3 Drawing Figures

LIGHT-SENSITIVE PHOTOGRAPHIC RECORDING MATERIAL

This invention relates to a light-sensitive photographic recording material containing at least one negatively functioning silver halide emulsion which is spectrally sensitized with special pyrimidone or thiopyrimidone benzothiazole monomethine cyanines.

In colour films, blue-sensitive silver iodobromide emulsions are used for the yellow layer. For full utilisation of the sensitivity, these emulsions may also be spectrally sensitized, and the sensitization maximum should be in the range of from 470 to 500 mn with a very steep drop to the long wavelengths in order to prevent intersection with the green spectral region.

The known symmetric and asymmetric monomethine cyanines of benzothiazole, naphthothiazole and benzoselenazole produce a I-maximum in this spectral region, but provide little or no gain in sensitivity because they also have a considerable desensitizing effect on the silver halide in the region of the inherent sensitivity.

Symmetric and asymmetric pyrimidone and thiopyrimidone cyanine dyes for sensitizing direct positive silver halide emulsions have been described in German Offenlegungsschrift No. 2,057,617. The dimethinecyanines, symmetric and asymmetric trimethinecyanines and styryl dyes of the pyrimidone and thiopyrimidone series have no sensitizing effect in negative emulsion and even considerably reduce the characteristic sensitivity and increase the fog.

It has now surprisingly been found that a small group, namely the asymmetric pyrimidone and thiopyrimidone benzothiazole monomethinecyanines, also have an excellent sensitizing effect in negative emulsions. In these emulsions, they produce a I-maximum at 475 to 505 nm and, compared with the known monomethinecyanines, used for sensitizing negative emulsions, they have little or no desensitizing effect in the range of inherent sensitivity. The dyes correspond to the following general formula:

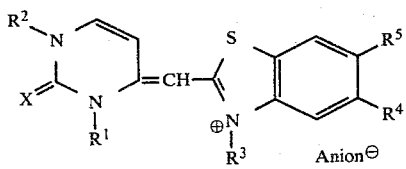

in which $R^1$ and $R^2$ which may be the same or different represent saturated or unsaturated aliphatic hydrocarbon groups, preferably having up to 6 carbon atoms, for example methyl, ethyl, propyl or butyl;

$R^3$ represents a saturated or unsaturated aliphatic hydrocarbon group preferably having up to 4 carbon atoms, which may be substituted, e.g. with phenyl, hydroxyl, alkoxy, halogen, amino, carboxyl, sulpho, sulphonylamino, sulphamoyl, carbonamido, carbamoyl, carbalkoxy, sulphato or thiosulphato;

$R^4$ and $R^5$ which may be the same or different, represent hydrogen or substituents selected from the group consisting of saturated or unsaturated aliphatic hydrocarbon groups preferably having up to 3 carbon atoms, such as methyl, ethyl or allyl; aryl such as phenyl or substituted phenyl, alkoxy such as methoxy or ethoxy, and halogen such as chlorine or bromine;

X represents O or S;

Anion ⊖ represents any photographically inert anion, e.g. a halide such as chloride, bromide or iodide, perchlorate, sulphate, alkylsulphate or p-toluenesulphonate; no anion is present if $R^3$ contains an acid group in the anionic form so that a betaine is present. The corresponding monomethinecyanines, which are substituted in the 4-position of the pyrimidone or thiopyrimidone ring, for example by methyl or phenyl, do not give I-maximum and produce only slight sensitization and are therefore unsuitable. Examples of suitable compounds are given below. The absorption maxima of these compounds were measured in a 2:8 mixture of m-cresol/methanol.

| No. | | Absorption maximum (nm) |
|---|---|---|
| 1 | 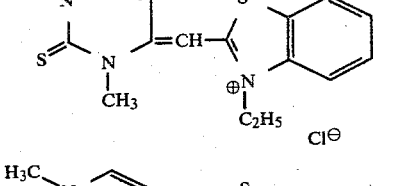 | 446 |
| 2 | 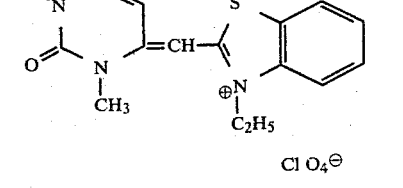 | 444 |
| 3 | 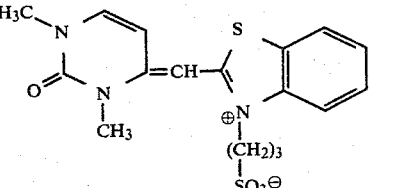 | 441 |
| 4 | 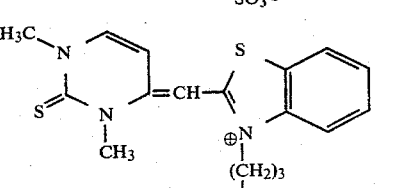 | 448 |
| 5 | 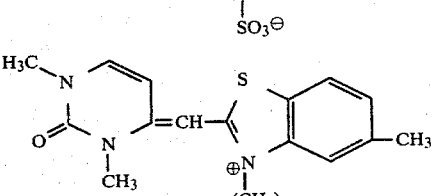 | 448 |
| 6 | 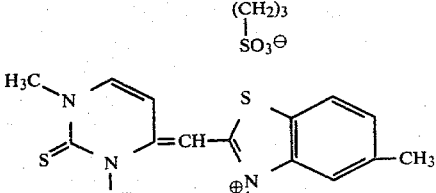 | 455 |

| No. | Structure | Absorption maximum (nm) |
|---|---|---|
| 7 | H3C-N, O, N-CH3 pyrimidone =CH- benzothiazole S, ⊕N-(CH2)4-SO3⊖, CH3 | 448 |
| 8 | H3C-N, S, N-CH3 pyrimidone =CH- benzothiazole S, ⊕N-(CH2)4-SO3⊖, CH3 | 455 |
| 9 | H3C-N, O, N-CH3 pyrimidone =CH- benzothiazole S, ⊕N-(CH2)3-SO3⊖, Cl | 448 |
| 10 | H3C-N, S, N-CH3 pyrimidone =CH- benzothiazole S, ⊕N-(CH2)3-SO3⊖, Cl | 455 |
| 11 | H3C-N, O, N-CH3 pyrimidone =CH- benzothiazole S, ⊕N-CH2-CH2-C(CH3)-SO3⊖, Cl | 447 |
| 12 | H3C-N, S, N-CH3 pyrimidone =CH- benzothiazole S, ⊕N-(CH2)4-SO3⊖, Cl | 456 |
| 13 | H3C-N, O, N-CH3 pyrimidone =CH- benzothiazole S, ⊕N-(CH2)3-SO3⊖, OCH3 | 454 |
| 14 | H3C-N, S, N-CH3 pyrimidone =CH- benzothiazole S, ⊕N-(CH2)3-SO3⊖, OCH3 | 460 |
| 15 | H3C-N, O, N-CH3 pyrimidone =CH- benzothiazole S, ⊕N-(CH2)4-SO3⊖, OCH3 | 453 |
| 16 | H3C-N, S, N-CH3 pyrimidone =CH- benzothiazole S, ⊕N-(CH2)4-SO3⊖, OCH3 | 461 |
| 17 | H3C-N, O, N-CH3 pyrimidone =CH- benzothiazole S, ⊕N-CH2-CH2-CH(SO3⊖)-CH3 | 441 |

The preparation of asymmetric pyrimidone monomethine cyanines from 1,3-disubstituted 6-methyl-2-oxopyrimidinium salts or the corresponding methylene bases has been described by Baumann et al in Ann. 717, 128 (1968). The preparation of one of the dyes is described in detail below. All the other dyes may be prepared by the same method.

Dye 3:

23.8 g of 1,3,6-trimethyl-2-oxopyrimidinium perchlorate and 30.5 g of 2-methylthio-3-sulphopropyl-benzothiazolium betaine are suspended in 300 ml of alcohol. The mixture is heated to 50° C. and 30 ml of triethylamine are added dropwise with vigorous stirring. The components go into solution and the dye begins to precipitate. The mixture is then stirred for 2 hours at 50° C. and then 3 hours at room temperature. The dye is suction filtered, washed with water and alcohol and dried in a vacuum at 80° C.

Yield: 24.7 g, Mp.:>300° C., absorption maximum: 441 nm.

E=53,000.

The sensitization dyes according to the invention may be used in any silver halide emulsion. the silver halide may be silver chloride, silver bromide or a mixture thereof, which may have a small silver iodide content of up to 10 mol percent. Silver bromide containing from 2 to 8 mol % of silver iodide is particularly preferred.

The silver halides may be dispersed in the usual hydrophilic synthetic or natural binders, for example in carboxymethy cellulose, polyvinyl alcohol, polyvinyl pyrrolidone, alginic acid and its salts, esters or amides, or, preferably, in gelatine.

The sensitization dyes to be used according to the present invention are preferably added to the photographic emulsion after chemical ripening and before casting. The methods used for this are well known in the art. The sensitization dyes are generally incorporated in the emulsion in the form of solutions, e.g. in alcohol or alcohol/water mixtures. The solvents must, of course, be compatible with gelatine and must not have any deleterious effect on the photographic properties of the emulsion. Water, methanol or mixtures thereof are generally used as solvents. Incorporation of the sensitization dyes according to the invention in the negative silver halide emulsions may also be carried out by the process according to German Offenlegungsschrift No. 2,609,742, in which the sensitizer is first ground up in the aqueous phase in the presence of dispersing agents to form a stable emulsion of particles smaller than 1μ, and this dispersion is then added to the silver halide emulsion. The quantity of sensitization dye added may vary within wide limits, e.g. from 10 to 1000 mg per mol of silver halide, preferably from 30 to 300 mg per mol of silver halide. The concentration of dye may be adapted to the requirements depending on the nature of the emulsion, the desired sensitization effect, etc. The most suitable concentration for any given emulsion can easily be determined by the usual tests employed in photographic practice.

The emulsions may also be chemically sensitized, e.g. by the addition of sulphur compounds such as allylisothiocyanate and sodium thiosulphate at the chemical ripening stage. Reducing agents may also be used as chemical sensitizers, e.g. the tin compounds described in Belgian Pat. Nos. 493,464 and 568,687, polyamines such as diethylene triamine and aminomethylsulphinic acid derivatives, e.g. according to British Pat. No. 789,823.

Noble metals such as gold, platinum, palladium iridium, ruthenium or rhodium and compounds of these metals are also suitable chemical sensitizers. This method of chemical sensitization has been described in the article by R. Koslowsky, Z. Wiss. Phot. 46, 65–72, (1951).

The emulsions may also be sensitized with polyalkylene oxide derivatives, e.g. with a polyethylene oxide having a molecular weight of from 1000 to 20,000, or with condensation products of alkylene oxides and aliphatic alcohols, glycols, cyclic dehydration products of hexitols, alkyl substituted phenols, aliphatic carboxylic acids, aliphatic amines, aliphatic diamines and amides. The condensation products have a molecular weight of at least 700, preferably more than 1000. These sensitizers may, of course, also be combined to produce special effects, as described in Belgian Pat. No. 537,278 and British Pat. No. 727,982.

The emulsions sensitized according to the invention may contain the usual stabilizers, e.g. homopolar or salt-type compounds of mercury containing aromatic or heterocyclic rings, such as mercaptotriazoles, or simple mercury salts, sulphonium mercury double salts and other mercury compounds. Azaindenes are also suitable stabilizers, particularly tetra- and penta-azaindenes, especially those which are substituted with hydroxyl or amino groups. Compounds of this type have been described in the article by Birr, Z. Wiss. Phot. 47, 2–27 (1952). Other suitable stabilizers include phenylmercaptotetrazole, quaternary benzothiazole derivatives and benzotriazole.

The emulsions may be hardened in the usual manner, for example with formaldehyde or halogenated aldehydes containing a carboxyl group, such as muchobromic acid, diketones, methane sulphonic acid esters and dialdehydes.

The emulsion layers may also be hardened with epoxide type hardeners or heterocylic ethylene imines or acrylolyls. Examples of such hardeners have been described, e.g. in German Offenlegungsschrift No. 2,263,602 and British Pat. No. 1,266,655. The layers may also be hardened by the process according to German Offenlegungsschrift No. 2,218,009 to produce colour photographic emulsions which are suitable for high temperature processing.

The silver halide emulsion layer sensitized according to the invention may also be hardened with diazine, triazine or 1,2-dihydroquinoline hardeners as described in British Pat. Nos. 1,193,290; 1,251,091; 1,306,544 and 1,226,655; French Pat. No. 7,101,716 or German Offenlegungsschrift No. 2,332,317. Examples of such hardeners include diazine derivatives containing alkylsulphonyl or arylsulphonyl groups, derivatives of hydrogenated diazines or triazines such as 1,3,5-hexahydrotriazine, fluorosubstituted diazine derivatives such as fluoropyrimidines, or esters of 2-substituted 1,2-dihydroquinoline- or 1,2-dihydroisoquinoline-N-carboxylic acids. Vinyl sulphonic acid hardeners, carbodiimide hardeners and carbamoyl hardeners may also be used, e.g. those described in German Offenlegungsschriften Nos. 2,263,602; 2,225,230 and 1,808,685; French Pat. No. 1,491,807, German Federal Pat. No. 872,153 and DDR Pat. No. 7,218. Other suitable hardeners have been described in, for example, British Pat. No. 1,268,550.

The emulsions according to the invention may be used for various photographic processes. They are particularly suitable for colour photographic recording materials.

EXAMPLE

To each kilogram of a gelatine silver iodobromide emulsion containing 0.4 mol of silver halide with an iodide content of 5 mol % were added $10^{-4}$ mol of sensitizer with stirring. The emulsions were cast on a cellulose acetate substrate layer in the usual manner. Th dried layer was exposed through a step wedge in a sensitometer behind the following filters: 1. Blue filter U 499 with maximum permeability at 449 nm; 2. Edge filter L 477 and 3. Edge filter L 510 which only transmitted light with long wavelengths above 477 nm and 510 nm, respectively. The material was then developed for 5 minutes at 20° C. in a developer of the following composition:

| | |
|---|---|
| Phenidone | 1.1 g |
| Potassium metabisulphite | 50 g |
| Sodium hydroxide solution | 160 ml |
| Hydroquinone | 15 g |
| Methyl glycol | 30 ml |
| Potassium bromide | 4 g |
| Potassium carbonate | 40 g |
| Made up with water to 1000 ml. | |

The material was then fixed, washed and dried in the usual manner. The results are summarized in the following Table. The values obtained with the known monomethines A and B are shown for comparison.

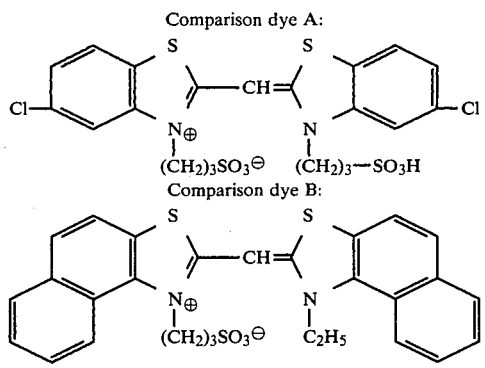

| Experiment No. | Dye No. | Sensitization maximum | Steps $\sqrt{2}$ U 449 | L 477 | Filter L 531 |
|---|---|---|---|---|---|
| 1 | none | — | 19.5 | 21.5 | 15 |
| 2 | A | 473 | 19 | 21.5 | 14.5 |
| 3 | B | 500 | 18 | 20.5 | 15 |
| 4 | 1 | 490 | 19.5 | 22.5 | 16.5 |
| 5 | 2 | 483 | 20 | 22.5 | 15.5 |
| 6 | 3 | 485 | 20 | 23 | 15.5 |
| 7 | 4 | 495 | 19.5 | 22.5 | 17 |
| 8 | 5 | 490 | 20 | 22 | 16 |
| 9 | 6 | 500 | 20 | 23 | 17.5 |
| 10 | 7 | 490 | 19.5 | 22 | 16 |
| 11 | 8 | 500 | 20 | 23 | 17.5 |
| 12 | 9 | 490 | 20.5 | 23 | 16.5 |
| 13 | 10 | 500 | 20.5 | 24.5 | 19.5 |
| 14 | 11 | 485 | 20 | 22.5 | 16 |
| 15 | 12 | 500 | 20.5 | 24 | 19 |
| 16 | 13 | 497 | 20.5 | 22.5 | 16.5 |
| 17 | 14 | 505 | 20 | 23 | 17.5 |
| 18 | 15 | 497 | 20.5 | 22.5 | 16 |
| 19 | 16 | 505 | 20 | 23 | 18.5 |
| 20 | 17 | 485 | 20 | 22.5 | 15.5 |

The values in the Table show clearly that the compounds according to the invention are superior to the known dyes A and B. Whereas the dyes according to the invention may in some cases even increase the sensitivity in the region of the inherent sensitivity of silver halide (filter U 449), the comparison dyes desensitize in this region. No gain in sensitivity can therefore be achieved with the comparison dyes in spite of a noticeable sensitization (filter L 477). Furthermore, the comparison dye B causes pronounced discolouration of the layer whereas none of the other dyes causes any discolouration after development.

The desensitizing effect of the comparison dyes shows up particularly clearly in the sensitization curves.

Figure 2:
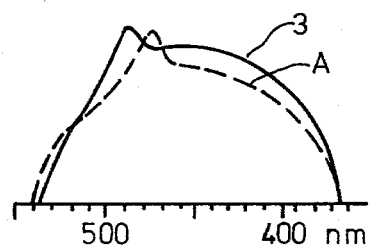
Figure 3:
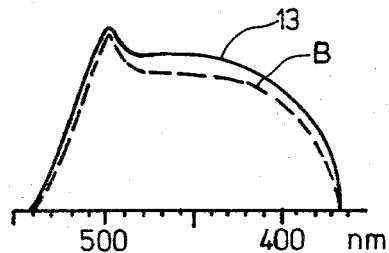

FIG. 1 shows the sensitivity curve of the unsensitized emulsion from experiment 1. FIG. 2 shows the sensitization curves of comparison dye A (experiment 2) and dye 3 (experiment 6). FIG. 3 shows the sensitization curves of comparison dye B (experiment 3) and of dye 13 (experiment 16).

I claim:

1. Light-sensitive photographic recording material comprising at least one negative silver halide emulsion layer which is spectrally sensitized with a monomethine cyanine dye of the following formula

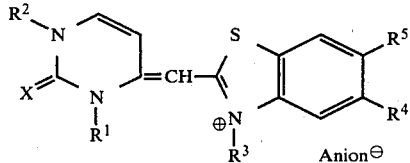

in which
$R^1$ and $R^2$ which may be the same or different represent each a saturated or unsaturated aliphatic hydrocarbon group;
$R^3$ represents a saturated or unsaturated, substituted or unsubstituted hydrocarbon group;
$R^4$ and $R^5$ which may be the same or different represent hydrogen or saturated or unsaturated hydrocarbon groups, alkoxy groups or halogen;
X represents O or S and
Anion $\ominus$ represents any photographically inert anion, and is absent when $R^3$ contains an acid group in the anionic form so that a betaine is present.

2. Material as claimed in claim 1 in which the negative silver halide emulsion is spectrally sensitized with a monomethine cyanine of the formula

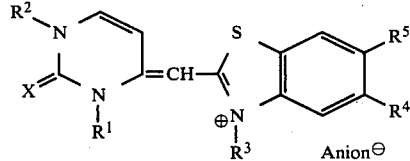

wherein
$R^1$ and $R^2$ represent methyl
$R^3$ represents alkyl or sulfoalkyl with 2 to 4 carbon atoms
$R^4$ and $R^5$ which may be the same or different represent hydrogen, chlorine, methyl or methoxy,
X represents S, and
Anion$\ominus$ represents or any photographically inert anion or is absent when $R^3$ represents sulfo alkyl.

* * * * *